United States Patent
Klusman

(10) Patent No.: US 8,531,071 B2
(45) Date of Patent: Sep. 10, 2013

(54) TURBINE ENGINE POWERED SYSTEM WITH HYBRID BEARING

(75) Inventor: Steven Arlen Klusman, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 438 days.

(21) Appl. No.: 12/906,326

(22) Filed: Oct. 18, 2010

(65) Prior Publication Data

US 2011/0156394 A1 Jun. 30, 2011

Related U.S. Application Data

(60) Provisional application No. 61/290,302, filed on Dec. 28, 2009.

(51) Int. Cl.
*H02K 7/09* (2006.01)
(52) U.S. Cl.
USPC .......................... 310/90.5; 310/90
(58) Field of Classification Search
USPC ................................ 310/90, 90.5
See application file for complete search history.

(56) References Cited

U.S. PATENT DOCUMENTS

| | | | |
|---|---|---|---|
| 3,722,624 A * | 3/1973 | Buckland | 184/6.11 |
| 4,167,295 A | 9/1979 | Glaser | |
| 5,519,274 A | 5/1996 | Scharrer | |
| 5,710,470 A | 1/1998 | Komata et al. | |
| 5,714,818 A | 2/1998 | Eakman et al. | |
| 5,928,131 A * | 7/1999 | Prem | 600/16 |
| 6,135,640 A | 10/2000 | Nadjafi | |
| 6,288,465 B1 | 9/2001 | Suzuki et al. | |
| 6,353,273 B1 | 3/2002 | Heshmat et al. | |
| 6,373,156 B2 | 4/2002 | Suzuki et al. | |
| 6,469,411 B2 | 10/2002 | Lembke | |
| 6,498,410 B1 | 12/2002 | Yashiro et al. | |
| 6,770,993 B1 | 8/2004 | Heshmat et al. | |
| 6,784,580 B2 | 8/2004 | Yashiro et al. | |
| 6,881,027 B2 | 4/2005 | Klaas et al. | |
| 2002/0079765 A1 | 6/2002 | Lembke | |
| 2005/0058533 A1 | 3/2005 | Belokon et al. | |
| 2006/0208589 A1 | 9/2006 | Foshage et al. | |

OTHER PUBLICATIONS

International Search Report and Written Opinion, PCT/US10/62179, Rolls-Royce Corporation, Mar. 31, 2011.

* cited by examiner

*Primary Examiner* — Tran Nguyen
*Assistant Examiner* — David Scheuermann
(74) *Attorney, Agent, or Firm* — Krieg DeVault LLP

(57) ABSTRACT

One embodiment of the present invention is a unique turbine engine. Another embodiment is a unique turbine engine powered system. Another embodiment is a hybrid bearing system for use in a turbine engine and/or a turbine engine powered system. Other embodiments include apparatuses, systems, devices, hardware, methods, and combinations for hybrid bearings, turbine engine systems with one or more hybrid bearings and turbine engine powered systems with one or more hybrid bearings. Further embodiments, forms, features, aspects, benefits, and advantages of the present application shall become apparent from the description and figures provided herewith.

24 Claims, 2 Drawing Sheets

TURBINE ENGINE POWERED SYSTEM WITH HYBRID BEARING

CROSS REFERENCE TO RELATED APPLICATIONS

The present application claims the benefit of U.S. Provisional Patent Application 61/290,302, filed Dec. 28, 2009, and is incorporated herein by reference.

FIELD OF THE INVENTION

The present invention relates to turbine engines and systems powered by turbine engines, and more particularly, to turbine engine powered systems with hybrid bearings.

BACKGROUND

Bearing systems that supports rotor systems, such as rotor systems of turbine engines and machinery driven thereby, remain an area of interest. Some existing systems have various shortcomings, drawbacks, and disadvantages relative to certain applications. Accordingly, there remains a need for further contributions in this area of technology.

SUMMARY

One embodiment of the present invention is a unique turbine engine. Another embodiment is a unique turbine engine powered system. Another embodiment is a hybrid bearing system for use in a turbine engine and/or a turbine engine powered system. Other embodiments include apparatuses, systems, devices, hardware, methods, and combinations for hybrid bearings, turbine engine systems with one or more hybrid bearings and turbine engine powered systems with one or more hybrid bearings. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
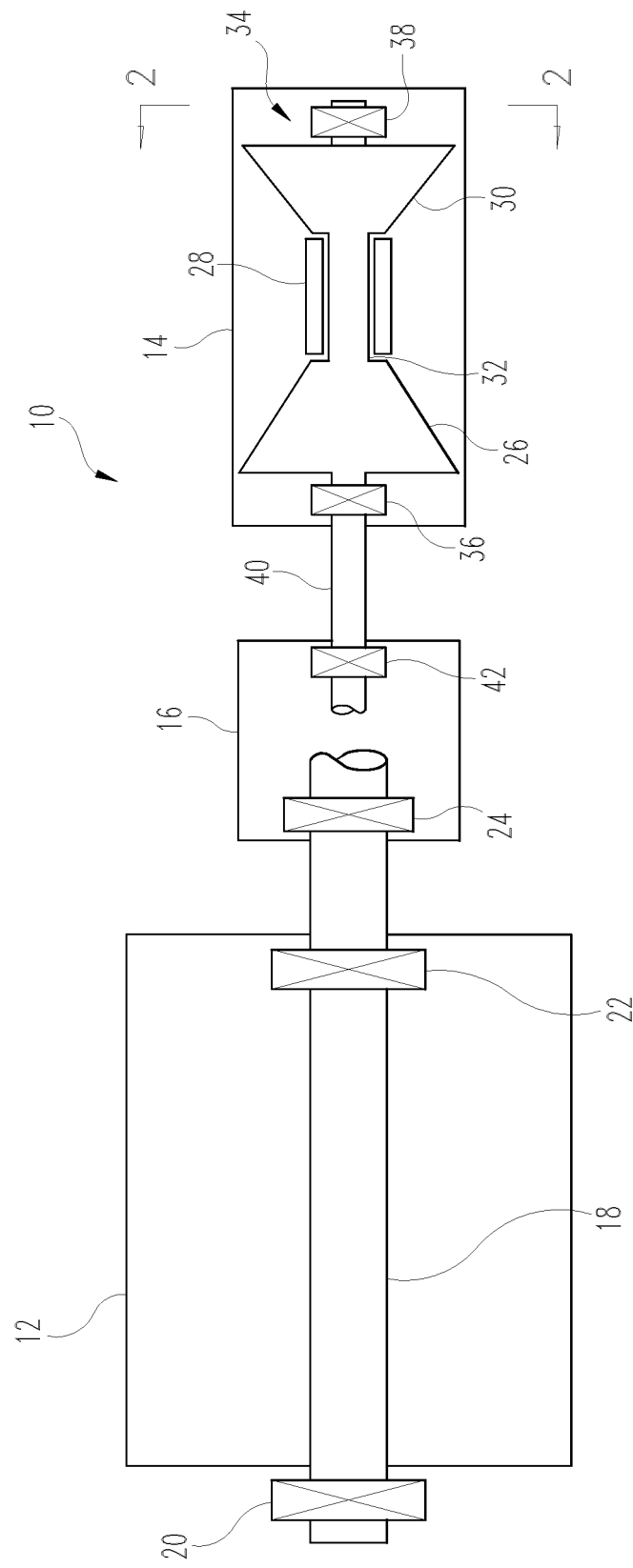
FIG. 1 schematically depicts a turbine powered system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, there is shown a non-limiting example of an embodiment of the present invention in the form of a system 10. System 10 includes a work machine 12 powered by a turbine engine 14. In one form, system 10 is a generator set, for example, in which case work machine 12 is a generator. In other embodiments, other types of work machines may be employed, such as pumps or compressors. In one form, turbine engine 14 is a gas turbine engine. In other embodiments, turbine engine 14 may be a steam turbine engine. The gas turbine engine of FIG. 1 is a single spool machine. In other embodiments, the gas turbine engine may be a multi-spool machine having more than one rotor system. In one form, work machine 12 is drivingly coupled to turbine engine 14 via a gearbox, such as a reducing gearbox 16. In other embodiments, work machine 12 may be coupled to turbine engine 14 directly or via a speed-increasing gearbox.

System 10 includes a rotor system having a substantially horizontal axis of rotation, and which is supported by bearings. In one form, the rotor system includes rotors in work machine 12, turbine engine 14 and gearbox 16. In other embodiments, the rotor system may pertain to only one or more of work machine 12, turbine engine 14 and gearbox 16. Each rotor is supported by one or more bearings. For example, work machine 12 includes a work machine rotor 18 supported by bearings 20 and 22. Work machine rotor 18 extends to gearbox 16, and is supported at gearbox 16 by a bearing 24. Although depicted as a unified single piece rotor, it will be understood that work machine rotor 18 may be an assembly of more than one component.

Turbine engine 14 includes a compressor 26, a combustor 28 and a turbine 30. Compressor 26 and turbine 30 are drivingly coupled via a shaft 32. Compressor 26, turbine 30 and shaft 32 are part of an engine rotor 34. Engine rotor 34 is supported by a bearing 36 and a bearing 38. An output shaft 40 couples turbine engine 14 to gearbox 16. Output shaft 40 is supported by bearing 36 at turbine engine 14 and by a bearing 42 at gearbox 16. It will be understood that the present invention is not limited to the rotor system or bearing arrangement thus illustrated and described. Rather, other rotor system and bearing arrangements may be employed, for example, having a greater or lesser number of bearings. Although depicted as a unified single piece rotor, it will be understood that engine rotor 34 may be an assembly of more than one component.

During normal operation, air is drawn into compressor 26, which compresses the air and delivers it to combustor 28. Fuel is added to the pressurized air discharged from compressor 26 and is combusted in combustor 28. The resulting hot gas stream is passed to turbine 30, which extracts mechanical power from the hot gas stream. Some of the mechanical power is delivered via shaft 32 to compressor 26 for driving compressor 26. Some of the mechanical power is delivered via shaft 32 to output shaft 40 for driving work machine 12. Bearings 20, 22, 24, 36, 38 and 42 support work machine rotor 18 and engine rotor 34 during normal operation and during startup of system 10.

Typically, bearings employ oil as a lubricant, which requires associated plumbing, sumps, an oil and scavenge pump system, and a cooling system. In order to reduce or eliminate necessity of a lubrication system, and in order to reduce start up loads and wear of bearing components, one or more of bearings 20, 22, 24, 36, 38 and 42 may be a hybrid bearing. In the depicted embodiment of FIG. 1, bearing 38 is a hybrid bearing system.

Figure 2:
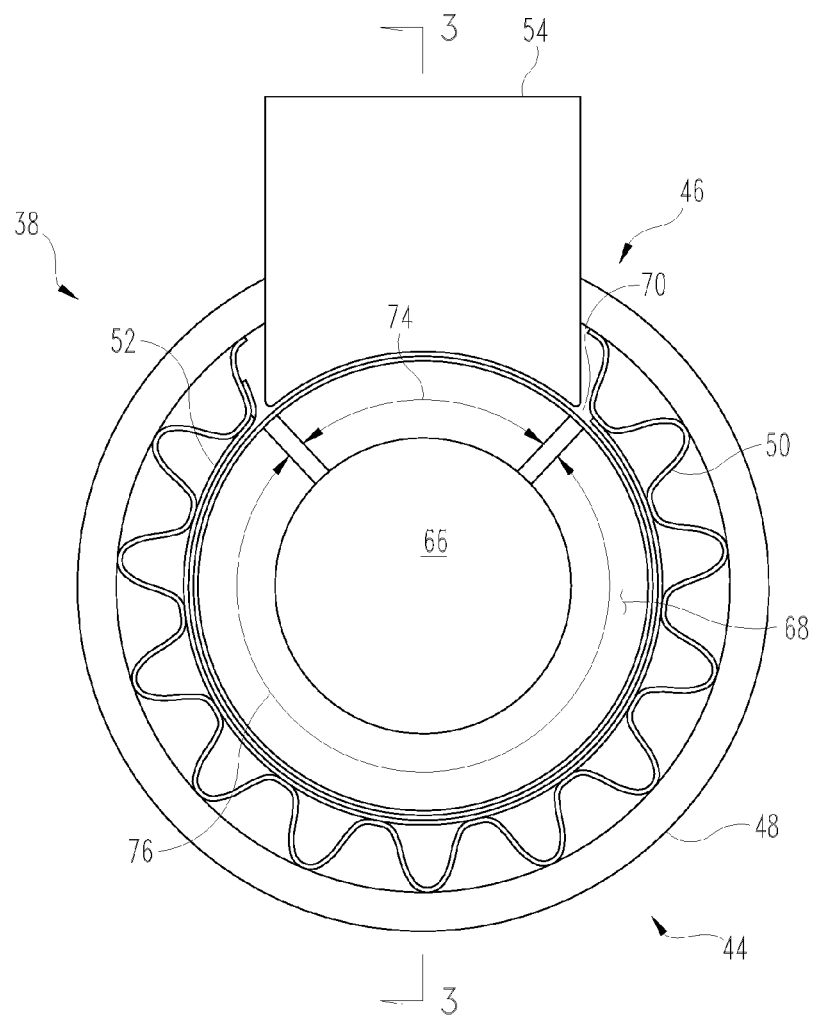
FIG. 2 is a cross section along an axial plane of a hybrid bearing system in accordance with an embodiment of the present invention.
Figure 3:
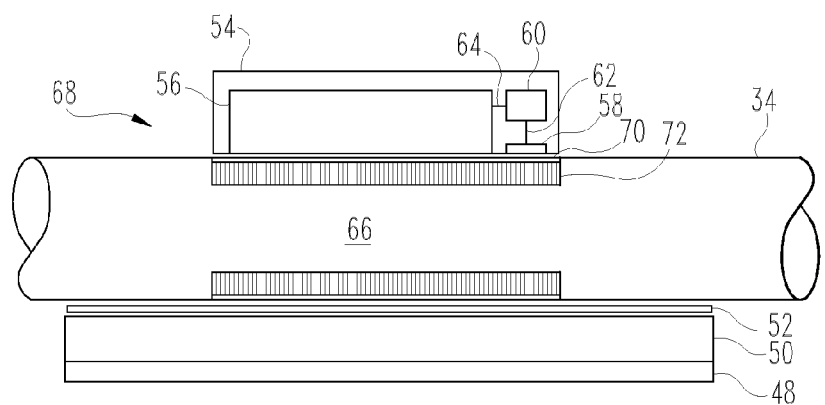
FIG. 3 is a cross section along a longitudinal plane of the hybrid bearing system of claim 2.

Referring now to FIGS. 2 and 3, a cross section of hybrid bearing 38 is depicted. In one form, hybrid bearing 38 includes a fluid bearing. In one form, the fluid bearing is a gas bearing in the form of a compliant foil bearing, such as a hydrodynamic air foil bearing 44. In other embodiments, other fluid bearing types may be employed. During normal operation of system 10, foil bearing 44 supports the rotor system, in particular, the aft end of engine rotor 34, applying an upward force to the rotor system via an air film generated at the interface between the rotor's journal and the hydrodynamic foil of the bearing. The air film may be dependent upon the journal being in a state of rotation. In one form, the air film is a hydrodynamic film. In one form, the hybrid bearing also includes a magnetic bearing 46. During startup, when no air film is present in the gas bearing, magnetic bearing 46 applies an upward force to the rotor system to support the rotor, thereby reducing starting loads and wear on the gas bearing's foil. During operation of system 10, an interruption of power to magnetic bearing 46 may have little or no adverse effect, since engine rotor 34 would be supported by compliant foil bearing 44.

Foil bearing 44 includes a housing 48, a bump foil 50 and a hydrodynamic foil, referred to herein as a top foil 52. Housing 48 supports bump foil 50, which supports top foil 52. Bump foil 50 provides compliance to foil bearing 44, e.g., in the event engine rotor 34 impacts foil bearing 44. Top foil 52 supports the hydrodynamic air film that supports engine rotor 34.

Magnetic bearing 46 includes an active magnetic actuator 54. Active magnetic actuator 54 includes an electromagnet 56, a gap sensor 58 and a controller 60. Controller 60 is communicatively coupled to gap sensor 58 via a communications link 62. In one form, gap sensor 58 is a Hall-effect transducer. In other embodiments, other sensor types may be employed. For example, an optical sensor may be employed in other embodiments.

Controller 60 is communicatively coupled to electromagnet 56 via a communications link 64. In one form, communications links 62 and 64 are wired connections. In other embodiments, other types of communications links may be employed for either or both of communications links 62 and 64, e.g., wireless and/or optical links. Although depicted adjacent to electromagnet 56, it will be understood that gap sensor 58 and controller 60 may be positioned remotely therefrom.

Gap sensor 58 is structured to sense the radial position of engine rotor 34, e.g., relative to magnetic bearing 46, e.g., by sensing the gap between engine rotor 34 and electromagnet 56. Controller 60 is configured to execute program instructions to operate electromagnet 56, including turning electromagnet 56 on and off to selectively attract a magnetic portion of engine rotor 34 to lift engine rotor 34 off foil bearing 44 during startup of turbine engine 14. Controller 60 is also configured to execute program instructions to provide active damping of the rotor system using electromagnet 56, e.g., active damping of engine rotor 34. In one form, the active damping is provided in the vertical plane. In other embodiments, active damping may be provided in other planes in addition to or in place of the vertical plane.

In one form, controller 60 is microprocessor based and the program instructions are in the form of software stored in a memory, e.g., of controller 60 (not shown). However, it is alternatively contemplated that the controller and program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions.

Engine rotor 34 includes a portion serving as a bearing journal, journal 66, which includes a magnetic journal portion 68 and a ring 70. In various embodiments, magnetic journal portion 68 may be magnetic in the active and/or passive sense. The "active" sense refers to the magnetic journal portion having the property of emanating a magnetic field, such as a magnetite lodestone or an electromagnet. The "passive" sense refers to the material having the property of being responsive to an external magnetic field, e.g., a ferromagnetic material. In one form, magnetic journal portion 68 includes a lamination stack 72 in engagement with engine rotor 34, e.g., in the form of a stack of ferromagnetic lamination rings piloted by engine rotor 34. Lamination stack 72 provides a magnetic component to journal 66 having less eddy currents than were a continuous and homogenous solid metal journal employed. Ring 70 is disposed around lamination stack 72 and positioned at the same axial location on engine rotor 34 as foil bearing 44. Ring 70 provides a smooth surface for compliant foil bearing 44 of hybrid bearing 38.

Active magnetic actuator 54, and in particular, electromagnet 56, is positioned above and adjacent to magnetic journal portion 68, and extends partially around journal 66 an arc length 74. In one form, arc length 74 is approximately 60 degrees, although other arc lengths may be employed in other embodiments. In one form, active magnetic actuator 54 is operable to attract magnetic journal portion 68, to thereby to thereby apply an upward force to lift magnetic journal portion 68, and hence engine rotor 34 off foil bearing 44. In other embodiments, active magnetic actuator 54 may additionally or alternatively be operable to repel magnetic journal portion 68, in which case, magnetic journal portion 68 would include a suitable magnetic pole.

Foil bearing 44 is positioned adjacent to magnetic journal portion 68 at the same journal axial location as active magnetic actuator 54. Foil bearing 44 extends around journal 66 an arc length 76. In one form, arc length 76 is approximately 300 degrees, although other arc lengths may be employed in other embodiments. Foil bearing 44 is positioned circumferentially adjacent to active magnetic actuator 54, in particular, electromagnet 56, and hence arc length 74 and arc length 76 do not overlap. Foil bearing 44 is operable to support a portion of engine rotor 34, e.g. the aft portion. Top foil 52 is disposed partially around magnetic journal portion 68, e.g., arc length 76, in order to support engine rotor 34.

Both foil bearing 44 and magnetic bearing 46 may be employed to operate system 10. For example, when starting turbine engine 14, magnetic bearing 46 is operated to lift the aft end of engine rotor 34 off foil bearing 44. In doing so, gap sensor 58 senses the proximity of journal 66 of engine rotor 34 to gap sensor 58. The proximity data is provided as feedback to controller 60 via communications link 62, which controls the output of electromagnet 56. Controller 60 supplies control signals to electromagnet 56 via communications link 64 to maintain a desired gap, e.g., the gap between electromagnet 56 and journal 66. The desired gap may be selected so as to ensure contact between journal 66 and top foil 52 is reduced or eliminated. This may reduce or prevent wear of foil bearing 44 during startup, and may also reduce the starting loads by reducing or preventing contact between journal 66 of engine rotor 34 and top foil 52 of foil bearing 44.

As the rotational velocity of engine rotor 34 increases, a hydrodynamic air film is generated between ring 70 of journal 66 and top foil 52. Once the air film is sufficient to support the weight of the aft end of engine rotor 34, the lift generated by magnetic bearing 46 may be reduced or eliminated.

During the operation of turbine engine 14, engine rotor 34 oscillations may be sensed by gap sensor 58, e.g. oscillations in the vertical plane. Gap sensor 58 may sense the oscillations based on the proximity of the journal 66 to gap sensor 58. The sensed data may be provided as feedback to controller 60 via communications link 62. Controller 60 may supply control signals to electromagnet 56 via communications link 64 to selectively attract magnetic journal portion 68, i.e., to switch electromagnet 56 on and off and/or otherwise vary the output of electromagnet 56 in response to the output of gap sensor 58. Active magnetic actuator 54 may thereby provide damping of engine rotor 34, for example, active damping in the vertical plane. In other embodiments, active magnetic actuator 54 may be controlled to provide a continuous or variable magnetic force during engine operation, without providing damping of engine rotor 34. In still other embodiments, active magnetic actuator 54 may be employed only during engine start, and may be shut off during normal engine 14 operation.

Embodiments of the present invention include a hybrid bearing system. They hybrid bearing system may include a journal having a magnetic journal portion; a magnetic actuator positioned adjacent the magnetic journal portion and extending around the journal a first arc length, wherein the magnetic actuator is operable to at least one of attract and repel the magnetic journal portion; and a fluid bearing positioned adjacent the magnetic journal portion and at a same journal axial location as the magnetic actuator, the fluid bearing extending around the journal a second arc length; wherein the first arc length is nonoverlapping of the second arc length.

In a refinement of the hybrid bearing system, the magnetic actuator is structured to selectively attract the magnetic journal portion.

In another refinement of the hybrid bearing, the magnetic actuator includes an electromagnet and a controller communicatively coupled to the electromagnet, wherein the controller is configured to execute program instructions to provide active damping of the journal using the electromagnet.

In yet another refinement of the hybrid bearing system, the journal is oriented horizontally, and the magnetic actuator is structured to lift the journal off the fluid bearing during a startup of rotation of the journal.

In still another refinement of the hybrid bearing system, the fluid bearing is a hydrodynamic gas bearing. The fluid bearing may include a hydrodynamic foil disposed partially around the journal. The fluid bearing may be a compliant foil bearing. The fluid bearing may also include a housing and a bump foil disposed between the hydrodynamic foil and the housing.

In yet still another refinement, the magnetic journal portion includes a lamination stack, further comprising a ring disposed around the lamination stack and positioned at the same axial location as the fluid bearing. In a further refinement, the magnetic actuator is an active magnetic actuator.

Another embodiment of the present invention may include a system, comprising, a rotor system having a magnetic journal portion and a substantially horizontal axis of rotation; and a hybrid bearing coupled to the rotor system for supporting at least a portion of the rotor system, the hybrid bearing including: an active magnetic actuator positioned above the magnetic journal portion and extending partially around the magnetic journal portion, wherein the magnetic actuator is operable to apply an upward force to the magnetic journal portion; and a gas bearing positioned adjacent the magnetic journal portion and circumferentially adjacent the active magnetic actuator, the gas bearing extending partially around the magnetic journal portion, wherein the gas bearing is operable to support the portion of the rotor system.

In a refinement of the system, the gas bearing is a hydrodynamic bearing. The gas bearing may include a hydrodynamic foil disposed partially around the magnetic journal portion. The gas bearing may be a compliant foil bearing. The gas bearing may include a housing and a bump foil disposed between the hydrodynamic foil and the housing.

In other refinements, the magnetic journal portion includes a lamination stack, and the system further includes a ring disposed around the lamination stack and positioned at the same axial location as the fluid bearing.

In another refinement, the active magnetic actuator includes an electromagnet and a controller communicatively coupled to the electromagnet, wherein the controller is configured to execute program instructions to provide active damping of the rotor system using the electromagnet.

In yet another refinement, the damping is active damping in a vertical plane.

In still another refinement, the system further includes a gap sensor configured to sense a radial position of the rotor system.

In a yet still another refinement, the active magnetic actuator includes an electromagnet, wherein the electromagnet and the gas bearing do not overlap circumferentially.

Yet another embodiment includes a turbine powered system, comprising: a turbine, a rotor system having a substantially horizontal axis of rotation, wherein the rotor system and the turbine are coupled at least one of mechanically and fluidly; and a hybrid bearing coupled to the rotor system for supporting at least a portion of the rotor system. The hybrid bearing includes: means for magnetically applying a first upward force to the rotor system; and means for pneumatically applying a second upward force to the rotor system.

In a refinement, the turbine powered system further comprises means for actively damping the rotor system.

In another refinement, the turbine powered system further comprises a work machine powered by the turbine, wherein the rotor system includes a rotor of the work machine supported at least in part by the hybrid bearing. In yet another refinement, the work machine is a generator.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:
1. A hybrid bearing system, comprising:
a journal having a magnetic journal portion;

a magnetic actuator positioned adjacent said magnetic journal portion and extending partially around said journal, wherein said magnetic actuator is operable to at least one of attract and repel said magnetic journal portion; and a fluid bearing positioned adjacent said magnetic journal portion and at a same journal axial location as said magnetic actuator, said fluid bearing extending partially around said journal without overlapping said magnetic actuator.

2. The hybrid bearing system of claim 1, wherein said magnetic actuator is structured to selectively attract said magnetic journal portion.

3. The hybrid bearing system of claim 1, wherein said magnetic actuator includes an electromagnet and a controller communicatively coupled to said electromagnet, wherein said controller is configured to execute program instructions to provide active damping of said journal using said electromagnet.

4. The hybrid bearing system of claim 1, wherein said journal is oriented horizontally, and wherein said magnetic actuator is structured to lift said journal off said fluid bearing during a startup of rotation of said journal.

5. The hybrid bearing system of claim 1, wherein said fluid bearing is a hydrodynamic gas bearing.

6. The hybrid bearing system of claim 5, wherein said fluid bearing includes a hydrodynamic foil disposed partially around said journal.

7. The hybrid bearing system of claim 6, wherein said fluid bearing is a compliant foil bearing.

8. The hybrid bearing system of claim 6, wherein said fluid bearing includes a housing and a bump foil disposed between said hydrodynamic foil and said housing.

9. The hybrid bearing system of claim 1, wherein said magnetic journal portion includes a lamination stack, further comprising a ring disposed around said lamination stack and positioned at the same axial location as said fluid bearing.

10. The hybrid bearing system of claim 1, wherein said magnetic actuator is an active magnetic actuator.

11. A system, comprising:
a rotor system having a magnetic journal portion and a substantially horizontal axis of rotation; and
a hybrid bearing coupled to said rotor system for supporting at least a portion of said rotor system, said hybrid bearing including:
an active magnetic actuator positioned above said magnetic journal portion and extending partially around said magnetic journal portion, wherein said magnetic actuator is operable to apply an upward force to said magnetic journal portion; and
a gas bearing positioned adjacent said magnetic journal portion and circumferentially adjacent to and at a same axial location as said active magnetic actuator, said gas bearing extending partially around said magnetic journal portion without overlapping said magnetic actuator, wherein said gas bearing is operable to support said portion of said rotor system.

12. The system of claim 11, wherein said gas bearing is a hydrodynamic bearing.

13. The system of claim 12, wherein said gas bearing includes a hydrodynamic foil disposed partially around said magnetic journal portion.

14. The system of claim 13, wherein said gas bearing includes a housing and a bump foil disposed between said hydrodynamic foil and said housing.

15. The system of claim 12, wherein said gas bearing is a compliant foil bearing.

16. The system of claim 11, wherein said magnetic journal portion includes a lamination stack, further comprising a ring disposed around said lamination stack and positioned at the same axial location as said gas bearing.

17. The system of claim 11, wherein said active magnetic actuator includes an electromagnet and a controller communicatively coupled to said electromagnet; and wherein said controller is configured to execute program instructions to provide active damping of said rotor system using said electromagnet.

18. The system of claim 11, wherein said damping is active damping in a vertical plane.

19. The system of claim 11, further comprising a gap sensor configured to sense a radial position of said rotor system.

20. The system of claim 11, wherein said active magnetic actuator includes an electromagnet, and wherein said electromagnet and said gas bearing do not overlap circumferentially.

21. A turbine powered system, comprising:
a turbine,
a rotor system having a substantially horizontal axis of rotation, wherein said rotor system and said turbine are coupled at least one of mechanically and fluidly; and wherein said rotor system includes a magnetic journal portion; and
a hybrid bearing coupled to said rotor system for supporting at least a portion of said rotor system, said hybrid bearing including:
means for magnetically applying a first upward force to said rotor system; and
means for pneumatically applying a second upward force to said rotor system, wherein said means for magnetically applying extends partially around said magnetic journal portion; wherein said means for pneumatically applying is positioned circumferentially adjacent to and at a same axial location as said means for magnetically applying; and wherein said means for pneumatically applying extends partially around said magnetic journal portion without overlapping said means for magnetically applying.

22. The turbine powered system of claim 21, further comprising means for actively damping said rotor system.

23. The turbine powered system of claim 21, further comprising a work machine powered by said turbine, wherein said rotor system includes a rotor of said work machine supported at least in part by said hybrid bearing.

24. The turbine powered system of claim 23, wherein said work machine is a generator.

* * * * *